455-618 AU 233 EX
FIP8106 XR 2,501,574
SS REFERENCE
EXAMINE
51

March 21, 1950 M. MORRISON 2,501,574

CARRIER-CURRENT SIGNAL SYSTEM

Filed Oct. 2, 1945 2 Sheets-Sheet 1

Inventor

Montford L Morrison

CROSS REFERENCE EXAMINER

Inventor
Montford Morrison

Patented Mar. 21, 1950 2,501,574

UNITED STATES PATENT OFFICE 2,501,574

CARRIER-CURRENT SIGNAL SYSTEM

Montford Morrison, Upper Montclair, N. J.

Application October 2, 1945, Serial No. 619,750

2 Claims. (Cl. 178—17)

The present invention relates to carrier current systems and has particular reference to multi-channel carrier-current signal systems.

An object of the invention is to provide a system which employs primary alternating-current carrier frequencies having non-sinusoidal wave-forms, which are much more easily and much more economically generated than the highly pure sinusoidal currents requisite in the prior art.

Another object of the invention is to provide a luminous flux modulator generating carrier-current wave-forms which are non-sinusoidal but which operate effectively in the same manner as sinusoidal wave-forms in the structure disclosed.

Still another object of the invention is to provide for the system a photoelectric generator, a one-piece luminous flux modulator in the form of a plate, a belt, a hollow cylinder and other suitable homeoid-of-revolution in which my improved modulating patterns are perforated.

A further object of the invention is to provide a multi-channel carrier-current signal transmission system in which the harmonic components of the generated carrier currents lie outside of the transmission or reception band of the system.

In my co-pending application, S. N. 603,717, filed July 7, 1945, I have disclosed a carrier-current system employing luminous flux modulators for generating signal carrier frequencies. In that application I have disclosed modulation patterns having sinusoidal boundaries producing carrier frequencies having no harmonic content below a predetermined order.

In the present invention I shall disclose a system employing a photoelectric generator having a perforated modulator in which the modulating pattern is non-sinusoidal and at the same time does not have any harmonic content below a predetermined order.

By the employment of this invention it is possible to construct luminous flux modulators for carrier current systems, out of thin sheet material by perforating a modulation pattern into it in a manner which does not destroy the integral structure of the sheet material, provides a strong and substantial structure and at the same time functions as effectively as though the modulations were continuously sinusoidal within the transmission or reception band of the system.

The perforations are not limited to plates but also may be employed in the form of belts, as is common practice in the sound reproducer art for testing sound reproducer systems for frequency response. These perforations may be applied to hollow cylinder modulators such as are found in the teleprinter art, and in fact may be applied to any suitable form of homeoid-of-revolution. However, in the present application, for conciseness and clearness of teaching, the embodiment of the invention herein described, will be limited to a system employing a revolving plate, though the modulation structure disclosed is applicable to any of the forms of modulator structure referred to above.

Figures 1, 2:
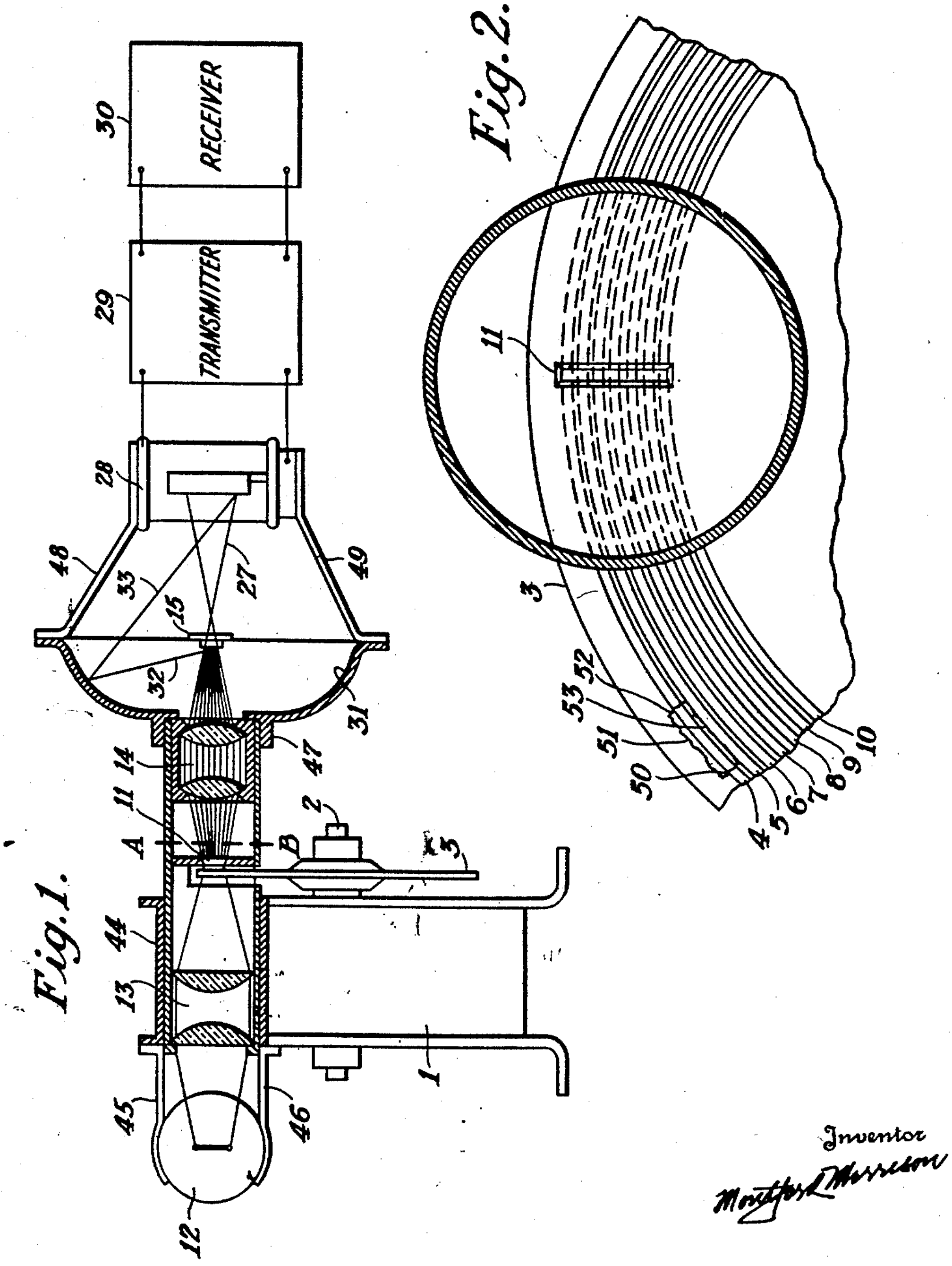
Figure 3:
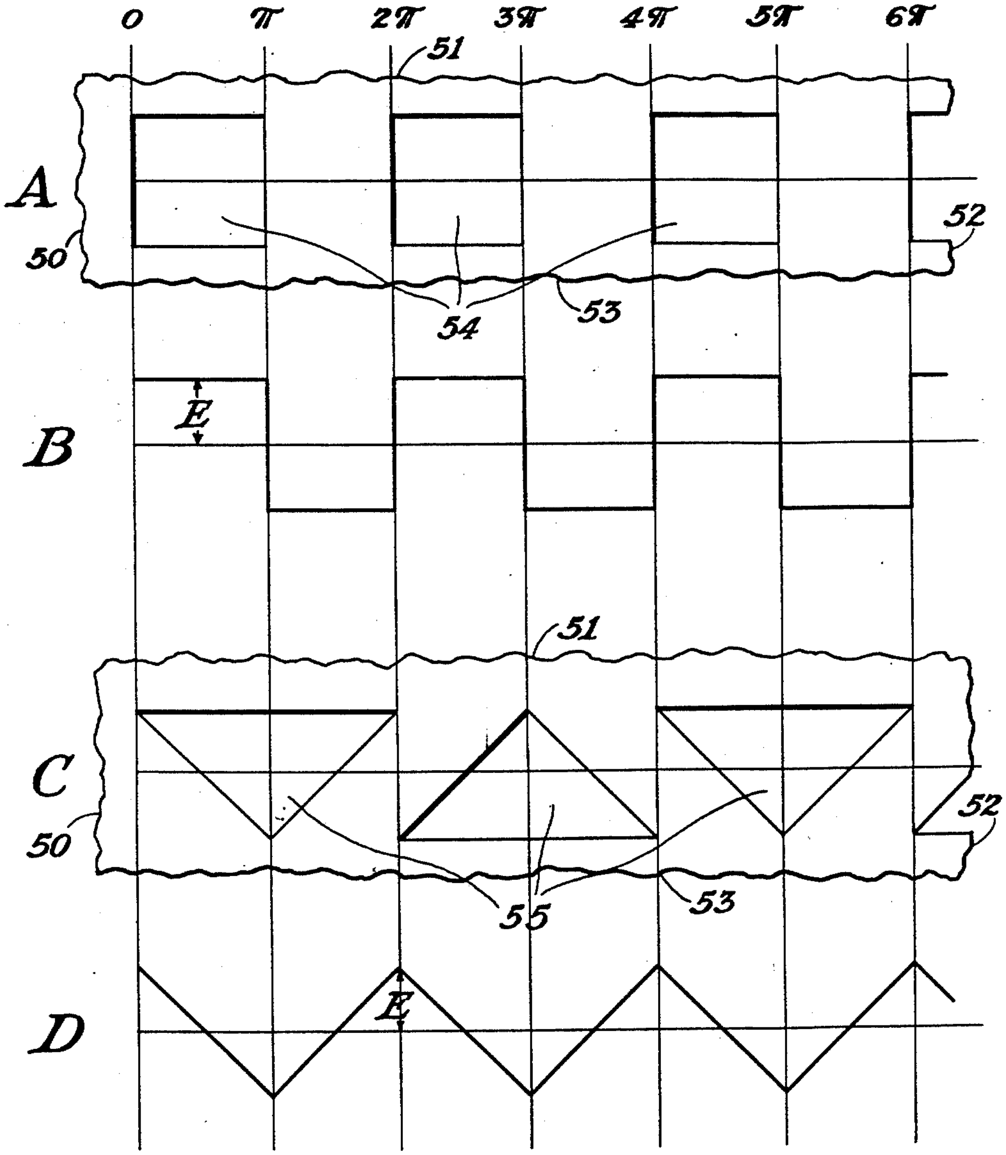

Further and other objects will be apparent and pointed out on reading the specification hereunder, particularly when taken in connection with the drawings in which Fig. 1 is an elevation, partly in section, illustrating my carrier-current transmission system; Fig. 2 is an enlargement of a section taken through Fig. 1 along the lines A—B looking west; and Fig. 3 shows, on a still more enlarged scale, the perforation details of the modulation perforations of the disc shown in Fig. 2 together with curves which assist in the teaching of the employment of my invention.

Referring to Fig. 1, 1 is a highly constant speed form of motor preferably driven from a direct-current source, as described in my co-pending patent application Serial No. 496,389, filed July 28, 1943, now issued as Patent No. 2,415,022. This form of a motor has a constancy of speed of the order of 0.01% and forms an excellent means of fixing the frequencies generated by my modulator hereinafter described. Motor 1 is provided with a shaft 2 onto which is fixed a disc 3 which forms the luminous flux modulator which I employ. While I have shown a disc form of luminous flux modulator in the figure, I may use any of the other forms enumerated above. The disc modulator 3 is shown in enlarged detail in the form of a segment in Fig. 2. The disc modulator 3 has a plurality of completely circular modulating tracks, 4, 5, 6, 7, 8, 9 and 10, which are provided with a cooperating stationary slit 11, Figs. 1 and 2. The slit 11 functions to limit the modulated light through the modulating tracks, 4 to 10 inclusive, to a narrow dimension along the traveling dimension of the tracks, so that the resultant modulation of luminous flux is substantially proportional to the instantaneous width of the modulating tracks passing by slit 11.

In Fig. 1, 12 is a source of luminous flux, preferably of the type of incandescent lamp commonly used in sound reproducer systems, which produces a straight line of light formed by a coiled filament. Source 12 is held in position by supports 45 and 46, fixed to frame 44 of motor 1, An optional condensing system 13 directs the line of light of source 12 onto modulating disc 3 and slit 11.

Optical system 14 gathers the light emerging through slit 11 and directs it towards a photoelectric cell 28, fixed in position by supports 48 and 49 and secured to the outer flange of member 47.

When it is desired to signal modulate the luminous flux emerging from optical system 14, I provide member 47 with a hollow reflecting surface 31 and a signal modulating device 15. Modulating device 15 may be any suitable means, such as for instance, a paper tape having printed signal characters on it. If the signal modulating device 15 is translucent, the signal modulated flux follows the light path indicated by 27, and when the signal modulating device 15 has a high coefficient of reflection, the reflected modulated flux from the modulating device 15 follows the path 32 to the reflector 31 and thence along the path 33 to the cathode of the photoelectric cell 28.

The output of photoelectric cell 28 is applied to transmitter 29 and thence to receiver 30.

A detailed description of the operation of Fig. 1 as a signal modulation device, is more comprehensively described in my Patents 2,380,666 and 2,380,667 issued July 31, 1945.

Referring to Fig. 3, along line A is illustrated one form of perforation which I use in my modulator 3, and the illustration along line A represents an enlarged cutout identified by the irregular rectangle bounded by the lines 50, 51, 52 and 53, Fig. 2. With a very narrow scanning beam which penetrates the slit 11, for instance, a scanning beam width of .001″, the influence of this width of the scanning beam may be taken as that of a fine line for purposes of teaching the invention, and therefore, it can be said not to cause distortion of the wave form due to the width of this scanning beam. With such a narrow width of scanning beam, the perforations 54 have an angular extent equal to exactly one-half period, as illustrated in the figure. The height or amplitude of these perforations is taken to be constant.

While in fact the sides of the perforations 54, when applied to a circular disc such as illustrated by 3 in Fig. 2, lie along the radii of a circle, and the bottom and top sides lie along the circumference of the same circle, these perforations are shown as rectangles in the figure for clearness in teaching the invention, and further, because of the difficulty in distinguishing slight angles and slight curvatures in such a figure.

It will be appreciated, with perforations such as shown along the line A, Fig. 3, applied to the structure illustrated in Fig. 1, there will be generated in the photoelectric cell, discrete flat-top pulses of current which, when suitably biased, form the so-called square wave form shown along line B, Fig. 3. Such a wave form as illustrated along line B is known to have a harmonic content represented by the equation.

$$e=\frac{4E}{\pi}\sum_{\substack{n=\text{odd}\\ \text{integers}}}\frac{1}{n}\sin nx \qquad (1)$$

In other words, such a wave form as illustrated along line B is composed of a fundamental and only odd harmonic components. All even harmonic components are suppressed therein and therefore, the second harmonic is absent therefrom.

Returning to the modulator 3 of Fig. 2, if each of the modulator tracks, represented by the numerals 4 to 10 inclusive, is provided with perforations such as illustrated in Fig. 3 by the numeral 54, and arranged in concentric rows to produce a 7th, a 9th, a 11th, a 13th, a 15th, a 17th and a 19th fundamental harmonic, no harmonic component of any of these frequencies will fall within the transmission or reception band, if the transmission or reception band extends only from the 7th harmonic to the 19th harmonic, since the lowest harmonic component of any of the fundamental harmonic frequencies is the 3rd harmonic component of the 7th fundamental harmonic frequency and this would correspond to the 21st fundamental harmonic, which is outside the transmission or reception band. I therefore limit my transmission or reception band to include all the fundamental carrier frequencies, but not any harmonic components of these frequencies which may be present in the system. In other words, the perforations as described, although they do produce harmonic components of their fundamental frequencies, do in effect function in the present system as would harmonic carrier frequencies having the same fundamental frequency in a purely sinusoidal wave-form.

Instead of the rectangular perforations 54, I may employ triangular perforations such as illustrated along line C by the identifying numeral 55. I have reversed every other triangle in order to provide a one-piece physical structure in the modulating sheet material which is strong and practical in operation, since having all the bases of the triangles in line would destroy the integrality of the sheet. It will be appreciated by those skilled in the art, that the triangles, being reversed with reference to apex, do not change, in the system, the form of the wave generated thereby, over that form generated by the triangles having their bases in line one with the other.

The form of the wave generated by the triangles 55, in either case, when applied to the structure illustrated in Fig. 1, results in a triangular wave-form which rises from zero to maximum and returns thereto periodically. Such a wave-form, when suitably biased, generates a triangular alternating current wave-form, such as shown along curve D, which has the well known equation:

$$e=\frac{8E}{\pi^2}\sum_{\substack{n=\text{odd}\\ \text{integers}}}\frac{1}{n^2}\cos nx \qquad (2)$$

which contains no even harmonics as in the case of the wave-form previously given, and has the further advantage that the amplitude of the first harmonic component is only one-third of that in the previous case. The function of such perforations as 55 along the modulation tracks 4 to 10 inclusive, will be understood by those skilled in the art in view of the description previously given.

The wave-forms illustrated in Fig. 3 along lines B and D, as well as the equations representing them, can be found in the exact form herein employed, in "An Elementary Treatise on Calculus" by Franklin, McNutt and Charles, published by the authors, 1913. The other equations used herein and related to harmonic analysis will also be found in this same treatise.

The applicant has shown two forms of perforations which may be employed in his system to function in the place of sinusoidal waves without being sinusoidal in fact, and it will now be shown how to determine further and other curves to perform the same function.

The formulas for determining the harmonic content of any shaped wave, represented by the symbol $f(x)$, are known to be $$\text{Amplitude} = \frac{1}{\pi}\int_0^{2\pi} f(x) \sin nx dx \qquad (3)$$

and $$\text{Amplitude} = \frac{1}{\pi}\int_0^{2\pi} f(x) \cos nx dx \qquad (4)$$

The formulas are in fact the same, the only difference being in the phase position of the harmonics.

Either one of these formulas may be employed for testing the proposed modification of my invention by substituting in the formulas the proposed mathematical expression for $f(x)$ and the order of harmonic which it is desired to eliminate, and of course solving the equation for zero.

Other and further forms of $f(x)$ may be obtained for modified forms of the present invention by subjecting the above formulas to the methods of the calculus and to the operations of harmonic analysis. In any case, where the labor involved in a mathematical analysis of a modification of my modulation patterns is too great, an actual curve representing the expression to be integrated, may be plotted out on paper and the change in amplitude studied and adjusted by any one of the many methods of instrumental and mechanical quadrature. Of course if harmonic analysers are available, the labor of determining modifications which come under the present invention, is greatly reduced.

Having described two species of my invention and having taught the art of constructing further species, what I claim is:

1. In a multi-channel carrier-current signal transmission system having a predetermined transmission band-width, a transmission system including a transmitter and a single transmission circuit, a single generating means continuously producing a combination of carrier frequencies in the form of waves of light intensity, each of said waves produced being composed of a fundamental frequency and a series of harmonic components of the fundamental frequency thereof therein, one of said waves having the second harmonic of its fundamental suppressed, a single light-modulating means signal-modulating all said waves simultaneously, photoelectric means converting all said waves into modulated signal carrier-currents in said transmission system, and said predetermined transmission band-width including the frequency of said suppressed second harmonic and excluding the frequency of an harmonic of a corresponding higher order in said series.

2. In a multi-channel carrier-current signal transmission system having a predetermined transmission band-width, a transmission system including a transmitter and a single transmission circuit, a single generating means continuously producing a combination of carrier frequencies in the form of waves of light intensity, each of said waves produced being composed of a fundamental frequency and a series of harmonic components of the fundamental frequency thereof therein, one of said waves having the second harmonic of its fundamental suppressed, a single light-modulating means signal-modulating all said waves simultaneously, photoelectric means converting all said waves into modulated signal carrier-currents in said transmission system, said predetermined transmission band-width including the frequency of said suppressed second harmonic and excluding the frequency of an harmonic of a corresponding higher order in said series, and a receiver for demodulating said carrier-currents into signal currents.

MONTFORD MORRISON.

REFERENCES CITED

The following references are of record in the file of this patent:

UNITED STATES PATENTS

| Number | Name | Date |
|---|---|---|
| 1,475,583 | Hoxie | Nov. 27, 1923 |
| 1,678,872 | Potter | July 31, 1928 |
| 1,781,361 | Briggs | Nov. 11, 1930 |
| 1,819,820 | Kent | Aug. 18, 1931 |
| 2,169,842 | Kannenberg | Aug. 15, 1939 |
| 2,184,978 | Nyquist | Dec. 26, 1939 |
| 2,205,469 | Curtis | June 25, 1940 |
| 2,370,985 | Morrison | Mar. 6, 1945 |